United States Patent [19]

Okada et al.

[11] Patent Number: 5,761,055
[45] Date of Patent: Jun. 2, 1998

[54] DRIVING PULSE OUTPUT LIMITING CIRCUIT

[75] Inventors: Yoichi Okada; Kenji Kawasaki, both of Tokyo; Haruo Watanabe, Saitama; Takeshi Karii, Saitama; Kenji Horiguchi, Saitama; Yoshinori Kobayashi, Saitama, all of Japan

[73] Assignees: Sony Corpration; Shindengen Electric Manufacturing Co., Ltd., both of Tokyo, Japan

[21] Appl. No.: 690,933

[22] Filed: Aug. 1, 1996

[30] Foreign Application Priority Data

Aug. 9, 1995 [JP] Japan ................... 7-222751

[51] Int. Cl.[6] ............................... H02M 3/335
[52] U.S. Cl. ................. 363/16; 363/21; 323/222
[58] Field of Search ............... 363/16, 21; 323/222, 323/282

[56] References Cited

U.S. PATENT DOCUMENTS

| | | |
|---|---|---|
| 4,270,164 | 5/1981 | Wyman et al. . |
| 4,733,104 | 3/1988 | Steigerwald et al. ........... 327/176 |
| 4,796,145 | 1/1989 | Oshikiri . |
| 5,093,771 | 3/1992 | Harvest . |
| 5,410,467 | 4/1995 | Smith et al. .................... 363/16 |
| 5,448,465 | 9/1995 | Yoshida et al. ................. 363/16 |
| 5,539,630 | 7/1996 | Pietkiewicz et al. ............ 363/17 |
| 5,640,310 | 6/1997 | Yasumura ....................... 363/21 |
| 5,691,889 | 11/1997 | Bazinet et al. ................. 323/222 |

FOREIGN PATENT DOCUMENTS

| | | |
|---|---|---|
| 0 146 855 | 7/1985 | European Pat. Off. . |
| 2 680 056 | 2/1993 | France . |

*Primary Examiner*—Stuart N. Hecker
*Attorney, Agent, or Firm*—Hill & Simpson

[57] ABSTRACT

In a driving pulse output limiting circuit, ideal switching operations are performed in all oscillation permitting frequencies and in all impedance conditions free from excessive surge current stresses due to excessive driving pulse width. While a charging current or a discharging current is being supplied to a capacity 11 which is connected between both ends of a switching element 3 or between windings of a main transformer 7, voltages are generated between both ends of a switching element 2 and between both ends of the switching element 3. A pulse voltage which is generated accordingly between both ends of an impedance element 13 connected in series to the capacity 11 is detected with a charging current detecting circuit 32 or a discharging current detecting circuit 35, and outputs of these circuits are applied to pulse limiting circuits 30 and 31 for blocking driving input signals to the driving circuit of switching elements 2 and 3, thereby limiting driving pulses to the switching elements so that these elements are driven after the pulse voltages applied between both ends thereof are lowered to about 0[V].

4 Claims, 8 Drawing Sheets

DRIVING PULSE OUTPUT LIMITING CIRCUIT

BACKGROUND OF THE INVENTION

1. Field of the Invention

This invention relates to a switching converter circuit which is used in switching power supplies and high frequency inverter circuits in various types of electronic appliances.

2. Description of the Related Art

FIG. 1 shows a single end push-pull converter circuit as an example of the prior art. In this Fig., a numeral 1 represents an input voltage source, numerals 2 and 3 designate switching elements, and a numeral 4 denotes a resonance capacitor. Numerals 5 and 6 designate resonance inductances: the resonance inductance 5 being composed, for example, of a leakage inductance of a transformer or a separate inductance, whereas the resonance inductance 6 being composed of a excitation inductance of a transformer. A numeral 7 represents a main transformer considered as a transformer providing an ideal output transformer, numerals 8 and 9 designate commutating diodes, numerals 10 and 11 denote capacities at both ends of the switching elements, numerals 12 and 13 represent impedance elements, a numeral 14 designates a pulse driving circuit, and a numeral 15 denotes an oscillator.

The capacities 10 and 11 at both ends of the switching elements may be only parasitic capacities of the switching elements 2 and 3 themselves, but external capacities are generally added to them due to measures taken for reducing switching loss as well as those for preventing radiation and inductive noise. The reference numerals 10 and 11 represent totals of the parasitic capacities and the external capacities respectively.

The converter shown in FIG. 1 transmits predetermined energy to a rectifier circuit and a load connected on the output side of the main transformer 7 by switching an input voltage supplied from the input voltage source 1 alternately with the switching elements 2 and 3 so as to vary a current supplied from the connected resonance capacitor 4 through the resonance inductance 5 and resonance inductance 6 to the main transformer 7 as well as a current between the capacities 10 and 11 between both ends of the switching elements 2 and 3.

Since the switching elements 2 and 3 repeat operations which are the same but reverse in phases thereof, description will be made only of operations of the switching element 3. FIG. 2 illustrates waveforms of voltages or currents in the components shown in FIG. 1.

Taking into consideration a time delay between the switching operations of the switching elements 2 and 3, these elements are ordinarily driven not with a duty ratio of 50% but with a certain dead time "A" as shown in FIG. 2 for preventing the switching elements 2 and 3 from being made conductive at the same time.

Immediately after the switching element 2 is turned off, a charging current to the capacity 10 and a discharging current from the capacity 11 are supplied in a route of the resonance capacitor 4-the resonance inductance 5-the resonance inductance 6 (or diverted to the main transformer 7)-the input voltage source 1 (during a period "a" shown in FIG. 2).

After completing charging of the capacity 10 and discharging of the capacity 11, the diode 9 is made conductive to complete charging of the resonance capacitor 4 in a commutation mode by way of the commutating diode 9 (during a period "b" shown in FIG. 2).

Then, the switching element 3 is made conductive to discharge the resonance capacitor 4 in a route of the resonance capacitor 4-the conductive switching element 3-the resonance inductance 6 (and the main transformer 7)-the resonance inductance 5-the resonance capacitor 4 (during a period "c" shown in FIG. 2).

Within this period "c", there is a power transmission period during which a current is supplied to a rectifier diode connected on the output side of the main transformer for actually providing electric power to the output side through the ideal output transformer 7 and a non-power transmission period during which the diode is made non-conductive and only an excitation current is supplied (latter half of the period "c"). Then, the similar operations are performed for the switching element 2.

Examinations of a slope of the voltage applied across both ends of the switching elements immediately after the switching element 2 or 3 is turned off, i.e., during charging and discharging of the capacities 10 and 11, indicated that the voltage rises or lowers at a slope of:

$$I1/(C1+C2)$$

wherein the reference symbol I1 represents a value of a main current immediately before the switching element 2 or 3 is turned on or off, and the reference symbols C1 and C2 designate values of the capacities 10 and 11 respectively.

Accordingly, the voltage applied between both ends of the switching element rises or lowers along rather a gentle slope as shown in FIG. 3 when I1 is small, i.e., in a no-load condition or a light-load condition, whereby a duty ratio allowed for driving the switching element has rather a small value when a converter oscillates at a high frequency.

The voltage applied across both ends of the switching elements (a voltage at a point "h" or a voltage obtained by subtracting the voltage at the point "h" from the voltage of the input voltage source 1) lowers along the slope described above when one of the switching elements is turned off, reaches a saturated voltage level of the switching element or the commutating diode, remains at this level, rises when the other switching element is turned off, reaches the voltage level of the input voltage source and is maintained at the level. Since these operations are repeated, the other switching element is allowed to be conductive only during a period of time from the moment that a pulse voltage applied across both ends of the switching elements reaches the saturated level after the continuous lowering to the moment that the switching element is opened (a period 16 shown in FIG. 3).

If the switching elements are set in driven conditions before the period 16, or during a period of time where the voltage applied across both ends of the switching elements starts lowering but has not reached the saturated level, the input voltage source will be shorted through the switching elements the moment that the switching elements are set in the driven conditions and allows an overcurrent (17 in FIG. 4) to be supplied, thereby applying excessive stresses to the switching elements.

Such excessive stresses cannot always be prevented simply by lowering a duty ratio of the driving pulse. In a heavy-load condition where impedance as considered from the primary side varies from inductive to capacitive under influences due to load resistance and an operating frequency, a resonance current supplied to a primary resonance circuit is more advanced in a phase thereof than that in a no-load condition or a light-load condition. In such a case, a commutation period "b" is shortened since a current must be supplied through the switching element in the positive direction. If a pulse width is narrowed by lowering the duty ratio, however, the current will find no place to go after the commutation, thereby operating the driving pulse output limiting circuit in a discontinuous mode.

This causes a deviation from the zero-cross switching condition by using resonance mode, thereby also applying excessive stresses to the switching elements.

Accordingly, it is necessary, in the condition where the current phase is advanced, to enhance the duty ratio for driving the switching elements with a sufficient pulse width in contrast to the condition described above.

In view of the operations described above or for solving these problems, there are known: a method (A) which switches a duty ratio dependently on operating conditions as shown in FIG. 5, a method (B) which detects a charging period and a discharging period for external capacities described above, and forcibly disconnects driving terminals for the switching elements as shown in FIG. 6, and a method (C) which reserves a rest period by varying a duty ratio dependently on oscillating frequencies as shown in FIG. 8.

The method (A) illustrated in FIG. 5 is configured to independently set a duty ratio for a light-load condition and a duty ratio for a heavy-load condition with a standby transformer 7' and a main transformer 7: by setting a main transformer resonance system in a standby condition by disconnecting it with a switch S in a standby condition of the output limiting circuit; and detecting pulses generated in the main transformer 7 with a pulse detector (PULSE Det.) and switching an input voltage VA to a duty ratio limiting circuit (Duty Limit) having a voltage-duty ratio characteristic as shown in FIG. 7 dependently on a detected output in a heavy-load condition of the output limiting circuit. Such a configuration allows the problems described above to be avoided by selecting a high input voltage VA to be applied to the duty ratio limiting circuit, thereby lowering a duty ratio of the driving pulses for the switching elements 2 and 3 in the light-load condition, and applying a low input voltage VA to the duty ratio limiting circuit, thereby enhancing the duty ratio in the heavy-load condition.

The method (B) shown in FIG. 6 detects a cross-end voltage of impedance elements 12 and 13 which are connected to the capacities 10 and 11 at both ends of the switching elements, thereby detecting a charging period and a discharging period for the capacities equivalent to the voltages, and forcibly stops operations of the switching element 2 or 3 during the period by shorting a pulse limit switching element 22 or 22' connected to driving terminals of the switching element 2 or 3. In other words, the method is configured to prevent the switching elements from being driven before the voltage applied across both ends of the switching elements has reached the saturated level as shown in FIG. 4 by stopping the switching element 2 or 3 while a charging current is being supplied to the impedance element 12 or 13.

Further, the method (C) drives the switching elements 2 and 3 by output of a duty ratio limiting circuit which has a frequency-duty ratio characteristic shown in FIG. 8. In other words, this method avoids the problems described above by selecting a low duty ratio when an oscillator for generating switching element driving signals oscillates at a high frequency and using a high duty ratio when the oscillator oscillates at a low frequency.

However, the method (A) which switches duty ratios dependently on operating conditions poses a problem that it can hardly cope with a broader range of input voltages since the duty ratios cannot have continuous values.

Further, the method (B) which detects a charging period and a discharging period for the external capacities, and forcibly disconnects driving terminals of the switching elements during the charging and discharging periods requires certain power for directly absorbing potentials on the driving terminals, and is disadvantageous from viewpoints of compact configuration of parts and switching loss.

When a bipolar transistor is used for the absorption, the switching time is delayed due to a storing time, etc. or operations are made unreliable due to the saturated voltage.

Furthermore, the method (B) requires independently pulling out driving voltages for upper and lower arm switching elements and is disadvantageous from a viewpoint of disturbance due to radiation since switching noise sources are inevitably increased by providing a circuit for pulling out a driving voltage for the upper arm.

Moreover, the method (C) which fixes duty ratios dependently on frequencies has low versatility for operating frequencies, narrows design freedom and hinders common use of parts since it restricts a pulse width, once an operating frequency range is changed, even in the heavy-load condition where a sufficient pulse width is originally required. In addition, this method poses a problem that it cannot provide an optimum pulse width even in the light-load condition having a high frequency when the driving pulse output limiting circuit is to be used in a broad load range.

SUMMARY OF THE INVENTION

In view of the foregoing, an object of this invention is to provide a driving pulse output limiting circuit in which a pulse width limiting circuit which allows no increase of switching loss at all frequencies permitting oscillation and at all resonance impedance, has a simple configuration and is capable of dynamically optimalizing a duty ratio.

The foregoing object and other objects of the invention have been achieved by the provision of a driving pulse output limiting circuit comprises: a cross-end voltage generated condition detector means for detecting a voltage applied across both ends of switching elements; and a means for prohibiting a driving circuit output from being provided to the switching elements during periods of time where a pulse voltage is generated across both ends of the switching elements.

The cross-end voltage generated condition detector means detects a voltage generated across both ends of the switching elements or a voltage generated across both ends of impedance elements connected in series to a snubber capacitor which is connected to both ends of a main transformer winding or is capable of converting a voltage generated across both ends of the impedance elements to an optional value with a transformer connected to the impedance elements.

Further, the cross-end voltage generated condition detector means detects an absolute value of a voltage applied across both ends of the switching elements or a voltage generated in an output transformer winding.

Accordingly, the driving pulse output limiting circuit according to the present invention is capable of detecting a pulse voltage applied across both ends of the switching elements by monitoring a pulse voltage generated across both ends of the main switching elements, in the impedance element or in the transformer winding and prohibiting the switching elements from being driven by pulses even while driving pulse output is provided.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 5:
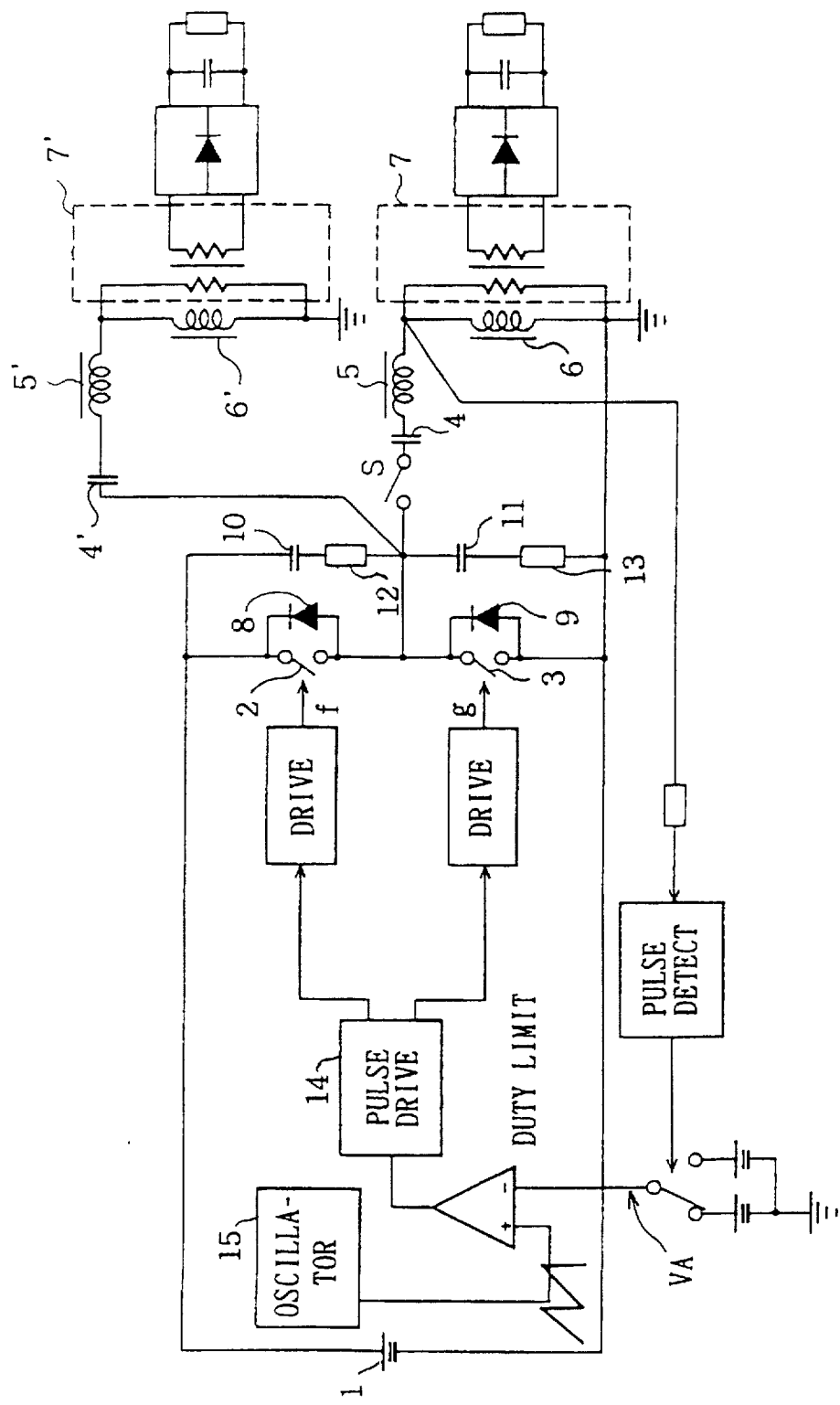
FIG. 5 is a block diagram illustrating the prior art.
Figure 6:
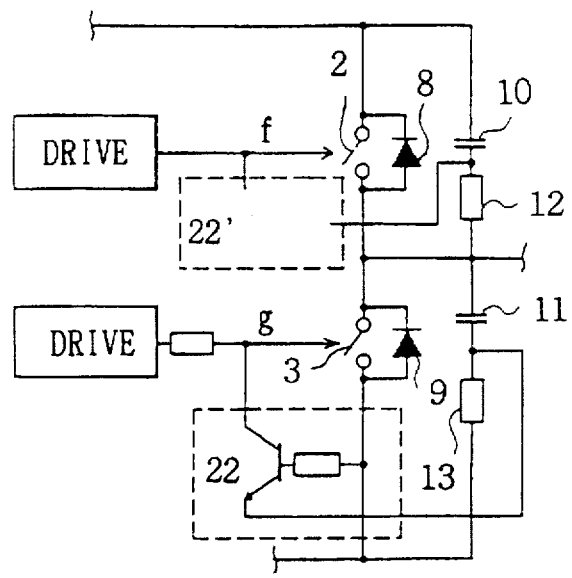
FIG. 6 is a circuit diagram illustrating a voltage detecting circuit and a pulse width limiting circuit according to the prior art.
Figure 7:
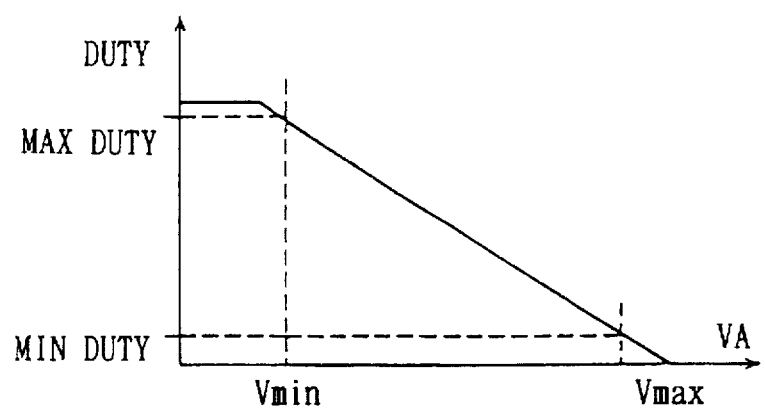
FIG. 7 is a graph illustrating relationship between pulse widths and voltages obtained by the prior art.
Figure 9:
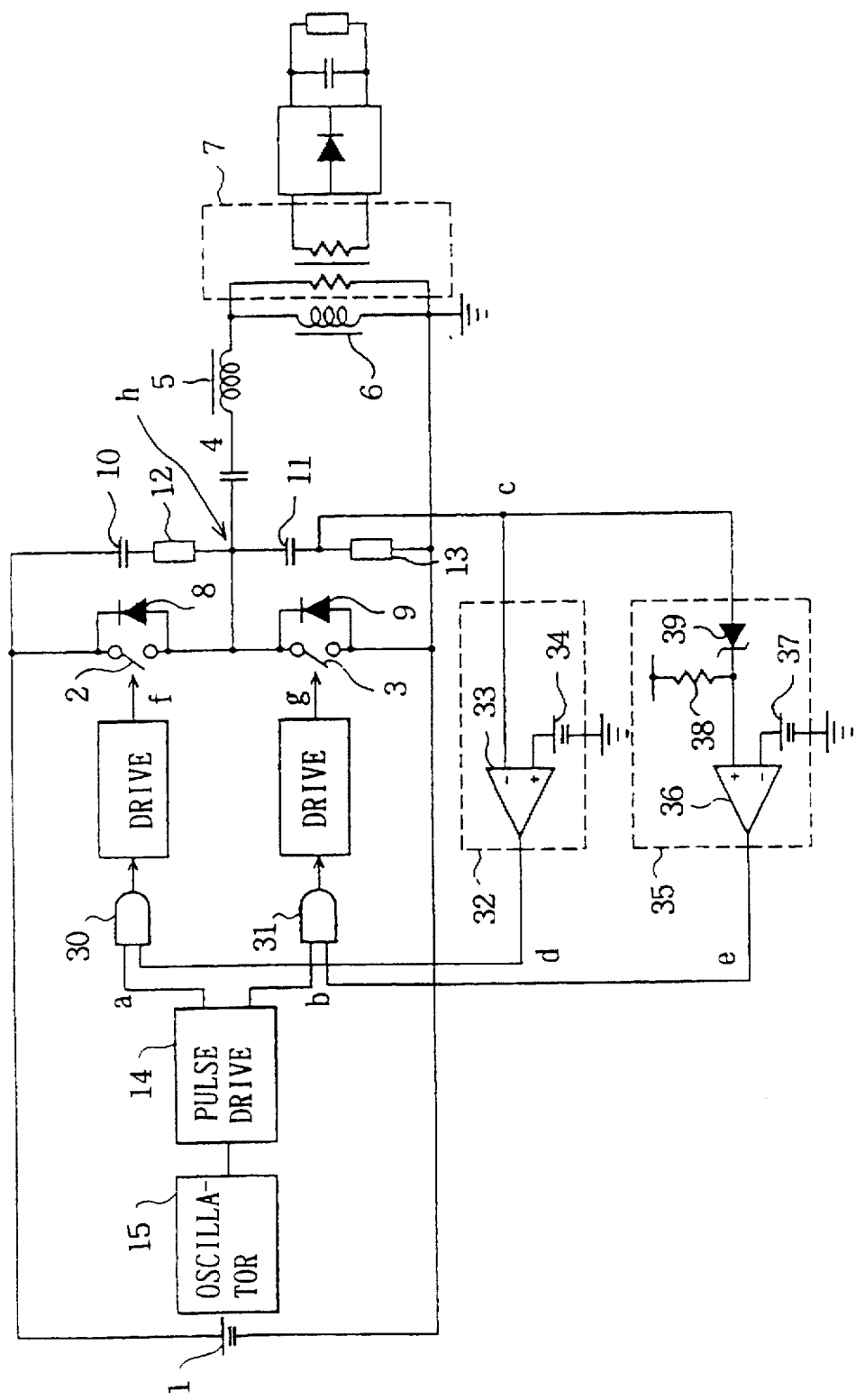
FIG. 9 is a circuit diagram illustrating a first embodiment of the driving pulse output limiting circuit according to the present invention.

Preferred embodiments of this invention will be described with reference to the accompanying drawings:

FIG. 9 is a circuit diagram illustrating a first embodiment of the present invention. In this drawing, components which are the same as those used for the prior art illustrated in FIG. 5 will be represented by the same reference numerals and detailed description of these components will be omitted. In FIG. 5, reference numerals 30 and 31 represent a high-voltage side pulse limiting circuit and a low-voltage side pulse limiting circuit respectively each of which is composed of an AND circuit. A reference numeral 32 designates a charging current detecting circuit which is used for detecting a charging current in a snubber circuit consisting of a capacity 11 and an impedance element 13, and is composed of a comparator 33 and a standard voltage source 34. A reference numeral 35 denotes a discharging current detecting circuit which is used for detecting a discharging current in the snubber circuit, and composed of a comparator 36, a standard voltage source 37, a resistor 38 and a Zener diode 39.

Figure 10:
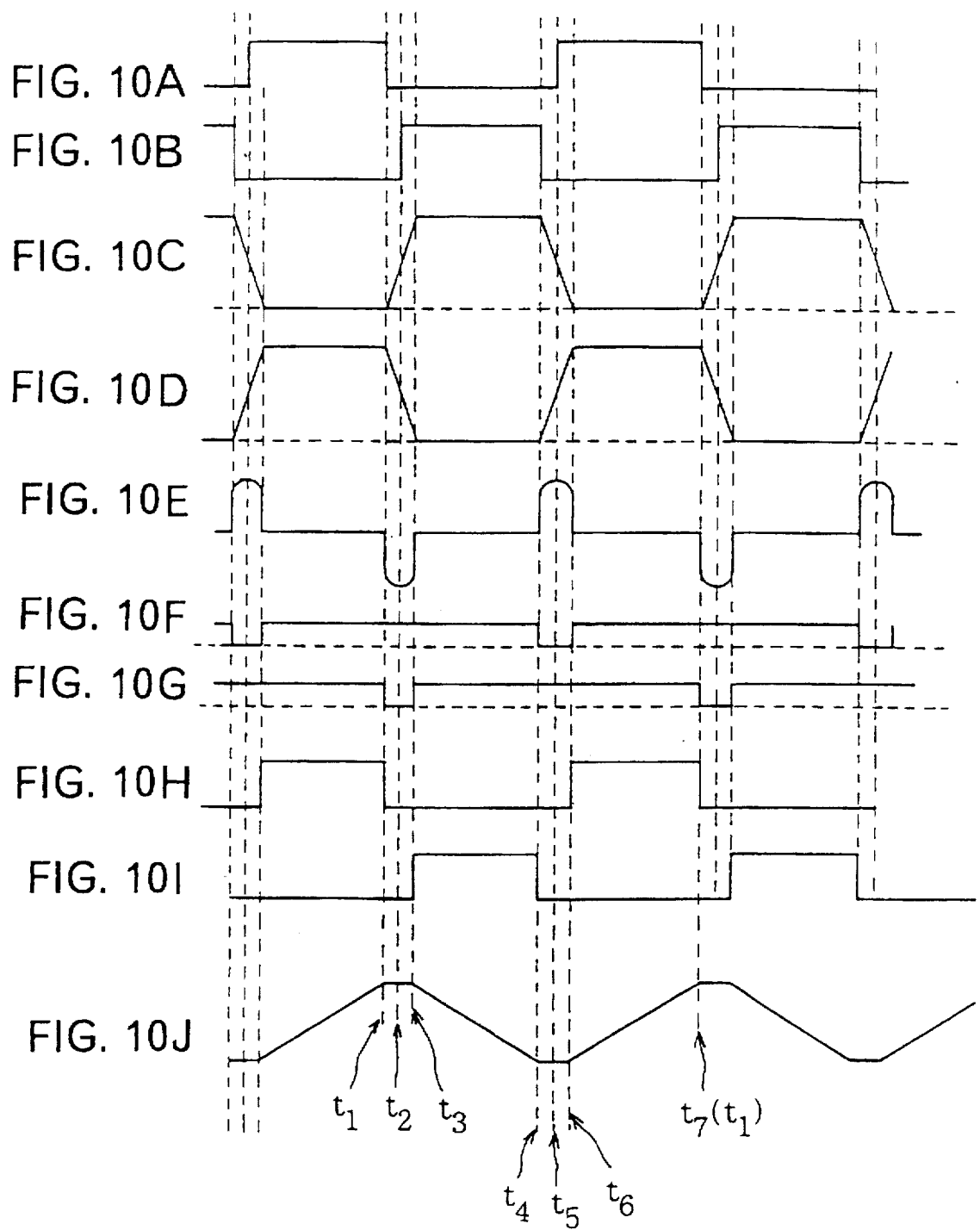
FIG. 10A to 10J are timing charts illustrating operating waveforms in the circuit shown in FIG. 9.

FIGS. 10A to 10J show operating waveforms in the components used in the first embodiment illustrated in FIG. 9: FIG. 10A is voltage at point "a" in FIG. 9, FIG. 10B is voltage at point "b", FIG. 10C is voltage applied between terminals of switching element 2, FIG. 10D is voltage between terminals of switching element 3, FIG. 10E is voltage at point "c", FIG. 10F is voltage at point "d", FIG. 10G is voltage at point "e", FIG. 10H is voltage at point "f", FIG. 10I is voltage at point "g" and FIG. 10J is current supplied to the resonance inductance 6 which is excitation inductance.

Operations of the circuit shown in FIG. 9 will be described with reference to FIGS. 10A to 10J.

Immediately before the switching element 2 is turned off at a time $t_1$ while it is conductive, a resonance current is supplied from the input voltage source 1 through the switching element 2, the resonance capacitor 4, the resonance inductance 5, and a parallel circuit composed of the resonance inductance 6 and the transformer 7 again to the input voltage source 1.

When the switching element 2 is turned off at the time $t_1$, the resonance current is supplied in a route from the resonance capacitor 4 through the resonance inductance 5, the resonance inductance 6 (or diverting through the parallel circuit composed of the resonance inductance 6 and the transformer 7), the impedance element 13 and the capacity 11 again to the resonance capacitor, and another route from the resonance capacitor 4 through the resonance inductance 5, the resonance inductance 6 (or diverting through the parallel circuit composed of the resonance inductance 6 and the transformer 7), the input voltage source 1, the capacity 10 and the impedance element 12 again to the resonance capacitor 4, thereby discharging the capacity 11 and charging capacity 10. In this while, a voltage at the point "h" gradually lowers from a level of a power supply voltage till a time $t_3$ at which the diode 9 is biased in the normal direction and made conductive.

Correspondingly to the lowering of the potential at the point "h" during the period of time from $t_1$ to $t_3$, the voltages between the terminals of the switching element 2 and the switching element 3 vary as shown in FIGS. 10C and 10D respectively.

Also during the period of time from $t_1$ to $t_3$, the discharging current is supplied from the capacity 11 to the impedance element 13 and a negative voltage is generated at the point "c" as shown in FIG. 10E.

A signal shown in FIG. 10G is generated at point "e" by shifting the potential at the point "c" to a positive level with a series circuit composed of the resistor 38 and the Zener diode 39 one of which is fixed as an adequate positive potential in the discharging current detecting circuit 35 of the snubber circuit, and connecting this potential to a non-inversion input terminal of the comparator 36 with an inversion input terminal of the comparator 36 connected to the standard voltage source 37 set at an adequate potential.

Driving pulse output to the switching element 3 is prohibited and a potential at the point "g" is kept as shown in FIG. 10I during the period of time from $t_1$ to $t_3$ by inputting the potential at the point "b" shown in FIG. 10B, i.e., a pulse driving signal for the switching element 3 and the signal at the point e to the AND gate of the low-voltage side pulse limiting circuit 31.

Even though the pulse driving circuit 14 outputs signals shown in FIG. 10B for driving the switching element 3 at time $t_2$ after the switching element 2 is turned off at the time $t_1$, the driving signals are blocked by the signals at the point "e" shown in FIG. 10G and the switching element 3 is not turned on or is not made conductive till the time $t_3$ at which potential is lowered at the point h and the diode 9 is normally biased.

Figure 1:
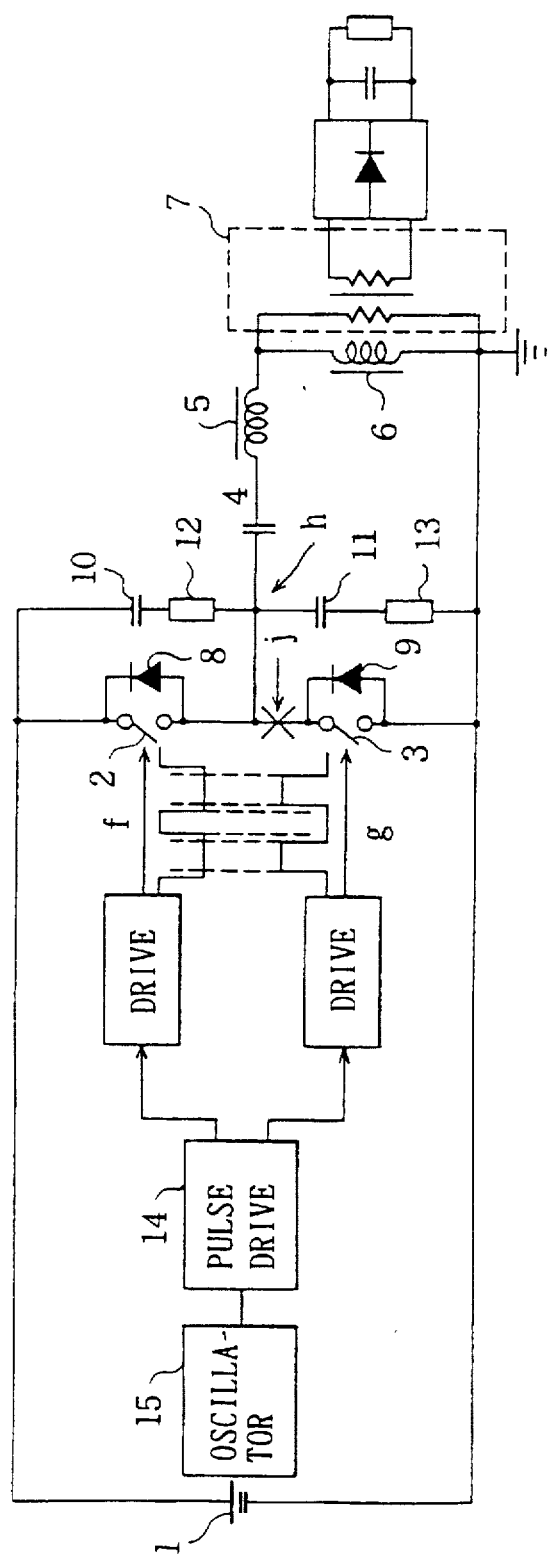
FIG. 1 is a circuit diagram illustrating a principle of a current resonance bridge converter.
Figure 2:
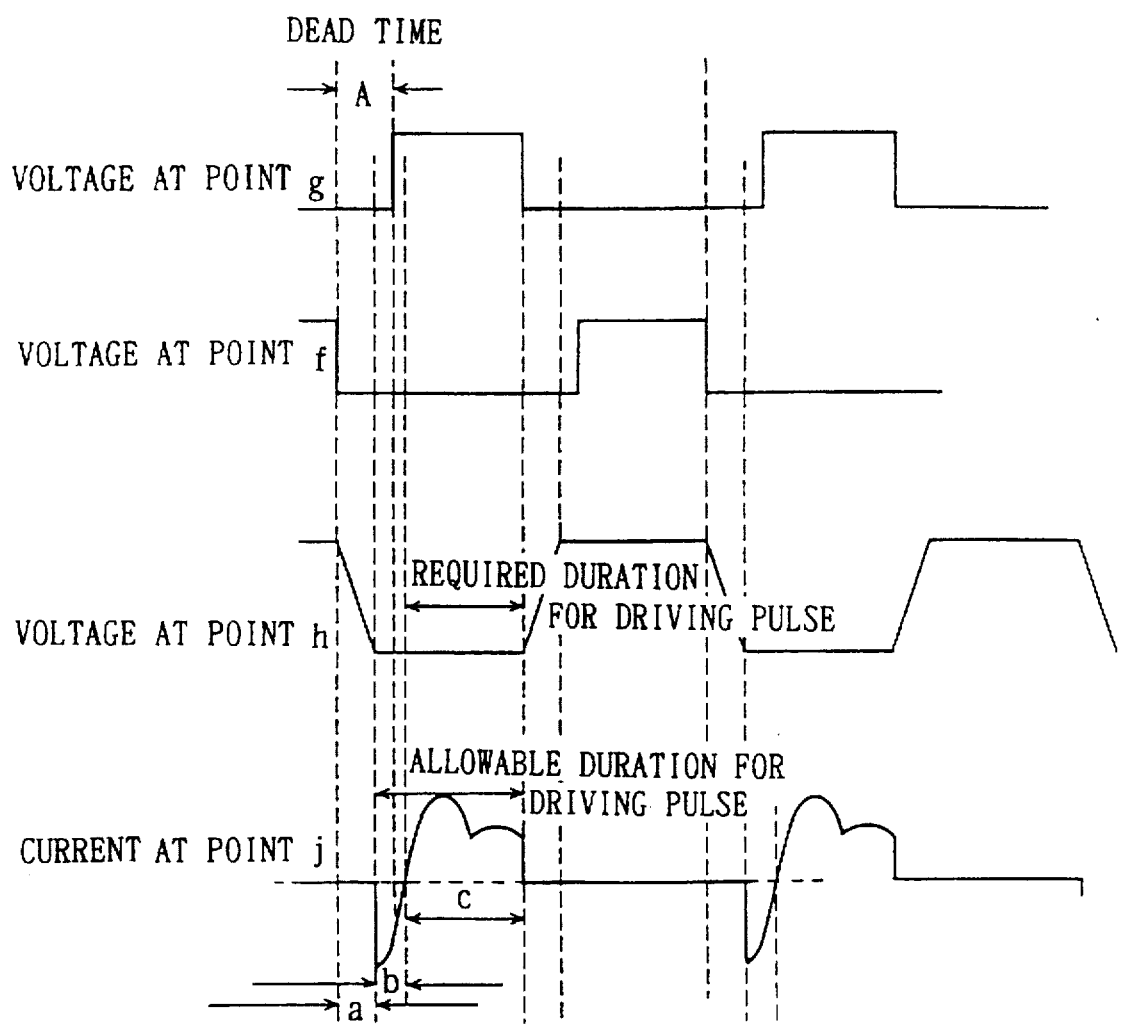
FIG. 2 is a timing chart illustrating operating waveforms in the bridge converter shown in FIG. 1.
Figure 3:
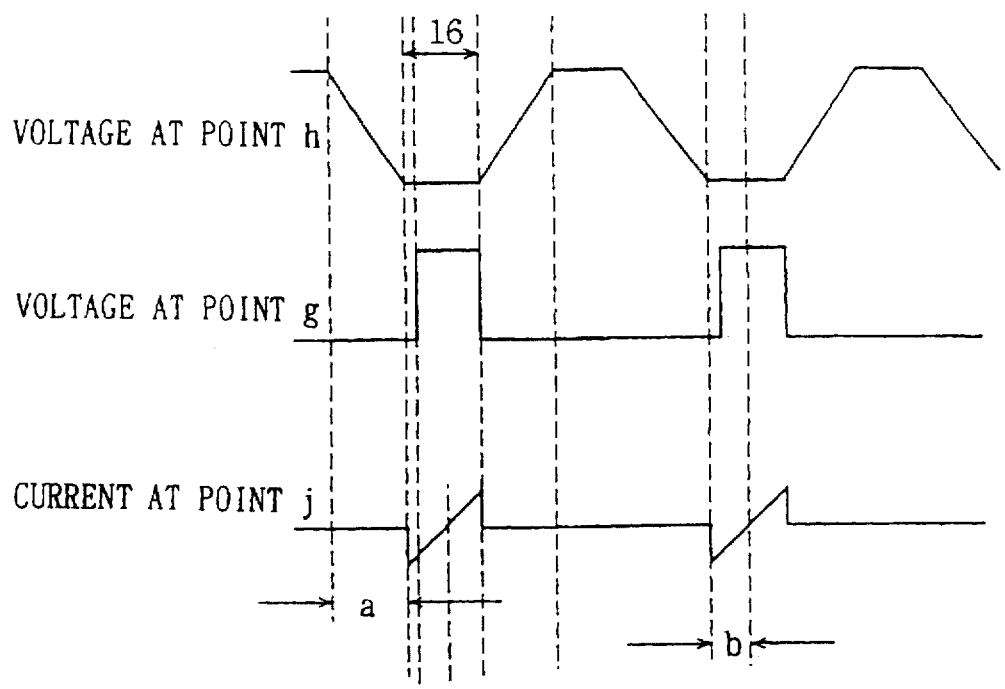
FIG. 3 is a timing chart illustrating operating waveforms in a light-load condition.
Figure 4:
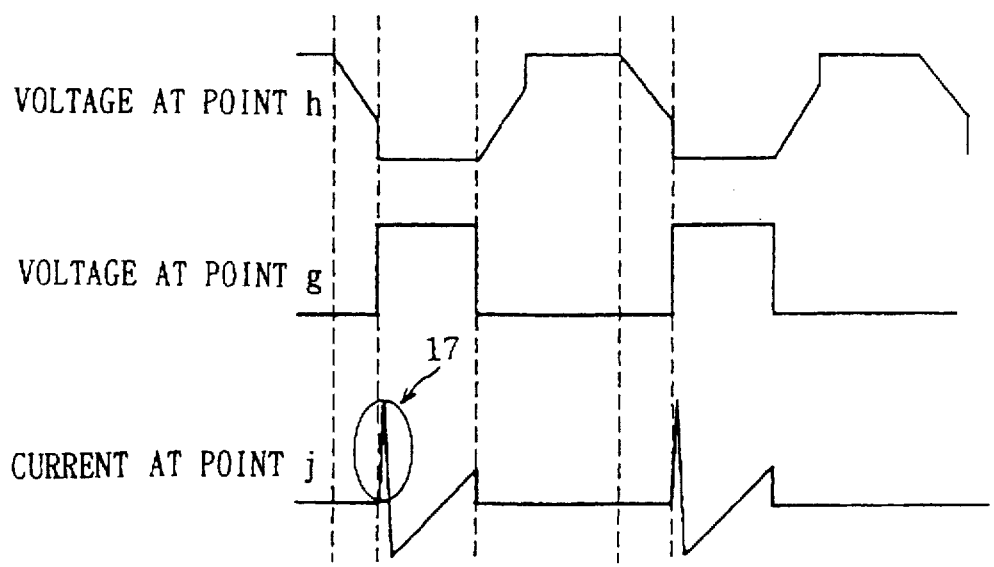
FIG. 4 is a timing chart illustrating operating waveforms having an excessive pulse width in the light-load condition.

Since the switching element 3 is made conductive after the potential is lowered sufficiently at the point "h" as described above, the driving pulse output limiting circuit according to the present invention does not allow an overcurrent from being supplied unlike the conventional example shown in FIG. 4 and is capable of safely making the switching element 3 conductive.

When the diode 9 and the switching element 3 are conductive at the same time at time $t_3$, the driving pulse output limiting circuit allows a current to be supplied in a route from the resonance capacitor 4 through the resonance inductance 5, the parallel circuit composed of the resonance inductance 6 and the transformer 7 and the switching element 3 again to the resonance capacitor 4.

During the next period from $t_3$ to $t_4$, the current is inverted by a resonance operation and is supplied in the same route in the reverse direction.

When the switching element 3 is turned off at time $t_4$, the resonance current is supplied in a route from the resonance capacitor 4 through the impedance element 12, the capacity 10, the input voltage source 1, the parallel circuit composed of the resonance inductance 6 and the transformer 7,and the resonance inductance 5 again to the resonance capacitor 4, and another route from the resonance capacitor 4 through the capacity 11, the impedance element 13, the parallel circuit composed of the resonance inductance 6 and the transformer 7, and the resonance inductance 5 again to the resonance capacitor 4 for discharging the capacity 10 and charging the capacity 11. Accordingly, the voltage at the point "h" is gradually enhanced till time $t_6$ at which the diode 8 is biased in the normal direction and made conductive.

In correspondence to the enhancement of the voltage at the point "h" during the period from $t_4$ to $t_6$, the voltages between the terminals of the switching element 2 and the switching element 3 vary as shown in FIGS. 10C and 10D respectively.

During the period from $t_4$ to $t_6$ also, the charging current for the capacity 11 is supplied to the impedance element 13 and a positive voltage as shown in FIG. 10E is generated at the point "c". Therefore, signals shown in FIG. 10F are generated at a point "d" on the output side of the comparator 33 by connecting the potential at the point c to the inversion input terminal of the comparator 33 disposed in the charging current detecting circuit 32 of the snubber circuit with the non-inversion input terminal of the comparator 33 connected to the standard voltage source 34 set at an adequate voltage.

Therefore, the pulse driving signals are prohibited from being provided to the switching element 2 and the voltage at a point "f" is kept as shown in FIG. 10H during the period from $t_4$ to $t_6$ by inputting the potential at the point "a" shown in FIG. 10A, i.e., the pulse driving signals for the switching element 2 and the signal at the point "d", to the AND gate of the high-voltage side pulse limiting circuit 30.

Owing to the operations described above, the switching element 2 is not made conductive till the time $t_6$ at which the voltage at the point "h" is enhanced and the diode 8 is biased in the normal direction though the pulse driving circuit 14 provides the driving signals for the switching element 2 as shown in FIG. 10A at the time $t_5$ after the switching element 3 is turned off at the time $t_4$ since the driving signals are blocked by the signals at the point "d" shown in FIG. 10F.

Figure 8:
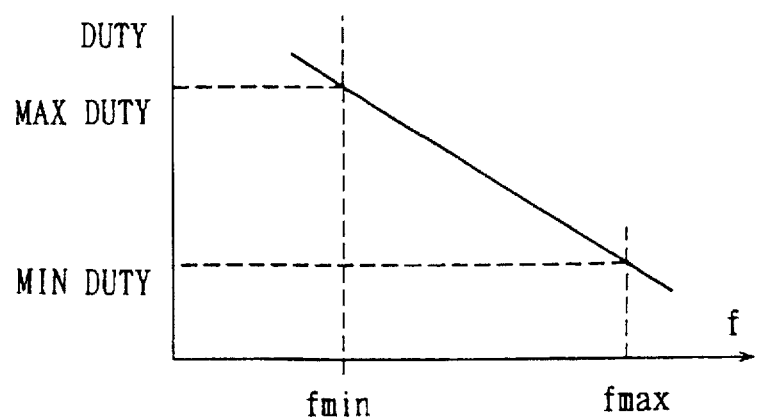
FIG. 8 is a graph illustrating relationship between pulse widths and frequencies obtained by the prior art.

Since the switching element 2 is conductive after the voltage at the point h is enhanced and the voltage between the terminals of the switching element 2 is lowered sufficiently, the driving pulse output limiting circuit according to the present invention does not allow an overcurrent from being supplied unlike the conventional example shown in FIG. 8 and is capable of safely making the switching element 2 conductive.

When the diode 8 and the switching element 2 are conductive at the same time at the time $t_6$, a current is supplied in a route from the resonance capacitor 4, the switching element 2, the input voltage source 1, the parallel circuit composed of the resonance inductance 6 and the transformer 7, and the resonance inductance 5 again to the resonance capacitor 4.

During the next period from $t_6$ to $t_7$, the resonance current is inverted by the resonance operation and is supplied in the same route in the reverse direction.

Subsequently, the driving pulse output limiting circuit repeats the operations from $t_1$ to $t_7$.

The driving pulse output limiting circuit according to the present invention which operates as described above is capable of preventing a switching elements from being conductive while a charging or discharging current is supplied to the capacity 11 even though the pulse driving circuit 14 provides driving pulses for making the switching elements conductive and allowing the switching element to be conductive only after charging or discharging of the capacity 11 completes, the diode 8 or 9 is placed in ON condition and the voltage between the terminals of the switching element is sufficiently lowered. Therefore, this circuit is always capable of maintaining a switching loss at a remarkably low level independently of oscillating frequencies and load impedance.

While in the aforesaid embodiment, it is configured to detect the charging and discharging periods by detecting voltages generated in the impedance elements connected in series to the snubber capacitor, the present invention is not limited thereto and this detecting method can adopt another detecting method.

For example, the driving pulse output limiting circuit can be modified, to apply a voltage generated across both ends of the switching elements directly to the charging current detecting circuit 32 and discharging current detecting circuit 35.

Figure 11:
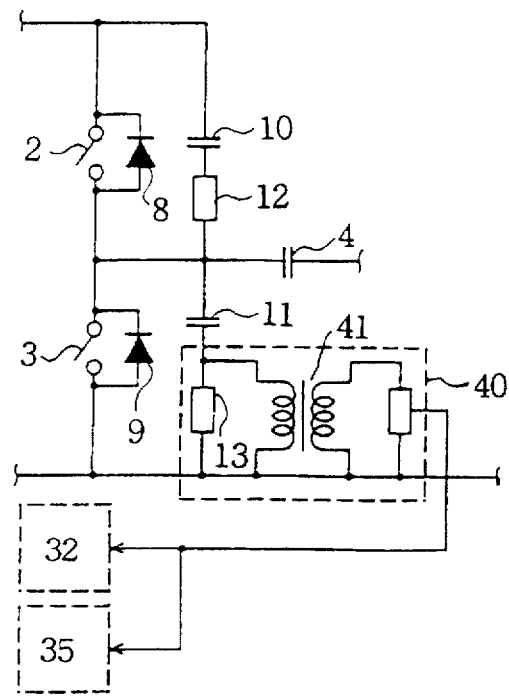
FIG. 11 is a circuit diagram descriptive of an impedance element having a transformer.

Further, an impedance element having a transformer can be used for detecting the charging and discharging periods as shown in FIG. 11. In this drawing, a reference numeral 40 represents an impedance element having a transformer and reference numeral 41 designates the transformer. In this circuit, a voltage generated in an impedance element 13 is applied to a primary side of the transformer 41 and a voltage proportional to a winding ratio is generated on a secondary side of the transformer 41. The driving pulse output limiting circuit can be operated in the same manner as described above by inputting the voltage on the secondary side through the impedance element to a charging current detecting circuit 32 and a discharging current detecting circuit 35. In this case, it is possible, by changing a ratio of windings between the primary side and the secondary side of the transformer 41, to convert the voltage generated in the impedance element to an optional value for facilitating signal processing at subsequent stages.

Figure 12:
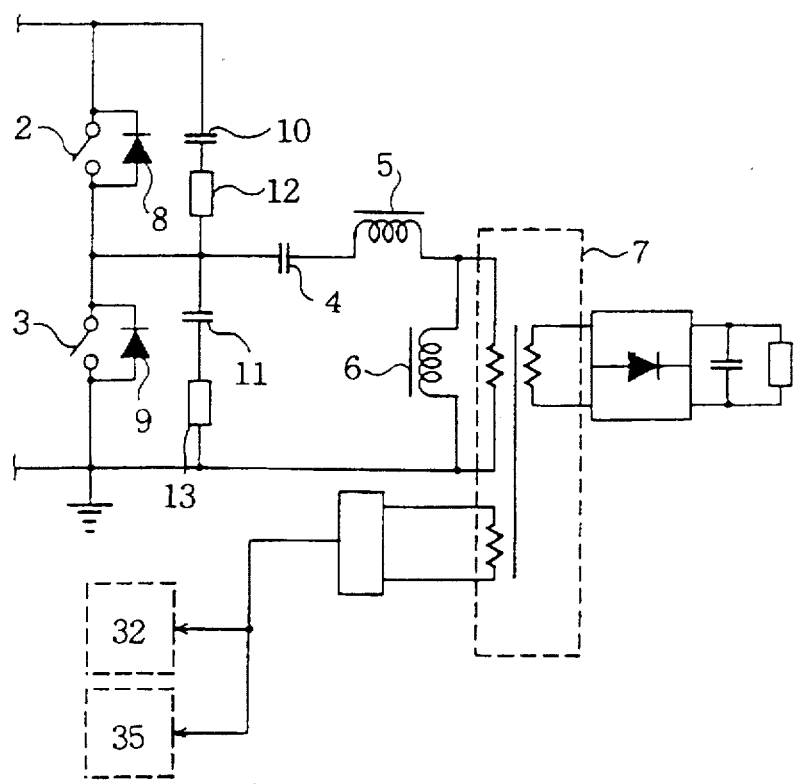
FIG. 12 is a circuit diagram descriptive of a method to detect a voltage with an output transformer winding.

Furthermore, a charging current and a discharging current can be detected with an output transformer winding as shown in FIG. 12. Since it has already been confirmed that a pulse voltage similar to the potential at the point "h" is generated in the output transformer winding, it is possible to obtain an effect similar to that obtained in the first embodiment illustrated in FIG. 9 by inputting a voltage detected from the winding disposed in the output transformer to a detecting circuit 32 or 35 as shown in FIG. 12.

Though the foregoing description has been made of a separate excitation type converter circuit taken as an example, the driving pulse output limiting circuit is not limited to the separate type converter circuit but applicable also to a self-excitation type converter circuit in quite the same manner. Similarly, the driving pulse output limiting circuit according to the present invention is applicable not only to a half-bridge type converter circuit but also a full-bridge type converter circuit.

The driving pulse output limiting circuit according to the present invention which has the configuration described above is capable of operating at all frequencies permitting oscillation and in all impedance conditions in the switching converter circuit so that the switching elements are made conductive after voltages between terminals thereof are lowered to approximately 0 volt, thereby making the switching elements free from electrical stresses due to excessive surge currents and ideally operating them at a low cost with possible lowest switching loss in all conditions.

Further, the driving pulse output limiting circuit according to the present invention can operate within a remarkably broadened frequency range, thereby allowing switching regulators to cover broad control ranges, i.e., broad input voltage ranges and broad load current variation ranges.

For converters such as current resonance bridge converters which positively use the resonance mode, in particular, the driving pulse output limiting circuit according to the present invention makes it possible to broaden control ranges thereof owing to the reduction of stresses on the switching elements and broadening of the operation permitting frequency ranges.

While there has been described in connection with the preferred embodiments of the invention, it will be obvious to those skilled in the art that various changes and modifications may be aimed, herefore, to cover in the appended claims all such changes and modifications as fall within the true spirit and scope of the invention.

What is claimed is:

1. A switching convertor comprising:

a first switching element;

a second switching element connected in series to said first switching element;

an input voltage source connected in parallel with the series circuit comprised of said first and second switching elements;

a pulse driving circuit for making said first and second switching elements turn on/off alternately;

a load circuit including a resonance circuit which is connected to the node of said first and second switching elements;

cross-end voltage detector means for detecting both end voltages of said first and second switching elements; and a means for forbidding said driving circuit outputting to said first and second switching elements during a period where pulse voltages are generated between both ends of said first and second switching elements, by judging from output of said both end voltage detecting means.

2. The driving pulse output limiting circuit according to claim 1, wherein said cross-end voltage detector means detects a voltage generated between both ends of said switching elements or both ends of impedance elements connected in series to a snubber capacitor which is connected to both ends of a main transformer winding.

3. The driving pulse output limiting circuit according to claim 2 wherein a transformer is connected to said impedance element so that the voltage generated between both ends of said impedance element can be converted to a fixed value.

4. The driving pulse output limiting circuit according to claim 1 wherein said cross-end voltage detector means detects an absolute value of the voltage generated between both ends of the switching elements or a voltage generated in an output transformer winding.

\* \* \* \* \*